(12) United States Patent
Xu et al.

(10) Patent No.: US 12,095,309 B2
(45) Date of Patent: Sep. 17, 2024

(54) AUTOMATIC TRANSFER SWITCH AND POWER SUPPLY SYSTEM

(71) Applicant: Delta Electronics (Shanghai) Co.,Ltd., Shanghai (CN)

(72) Inventors: Feidong Xu, Shanghai (CN); Mengsheng Wu, Shanghai (CN); Mengyu Liang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 53 days.

(21) Appl. No.: 18/060,572

(22) Filed: Dec. 1, 2022

(65) Prior Publication Data

US 2023/0231409 A1    Jul. 20, 2023

(30) Foreign Application Priority Data

Jan. 14, 2022   (CN) .......................... 202210043011.2

(51) Int. Cl.
| | |
|---|---|
| H02J 9/06 | (2006.01) |
| B60L 53/14 | (2019.01) |
| B60L 53/51 | (2019.01) |
| B60L 53/52 | (2019.01) |
| B60L 55/00 | (2019.01) |
| H02J 3/32 | (2006.01) |

(52) U.S. Cl.
CPC ............. *H02J 9/068* (2020.01); *B60L 53/14* (2019.02); *B60L 53/51* (2019.02); *B60L 53/52* (2019.02); *B60L 55/00* (2019.02); *H02J 3/322* (2020.01); *H02J 9/062* (2013.01); *H02J 2300/24* (2020.01); *H02J 2300/28* (2020.01)

(58) Field of Classification Search
CPC .. H02J 9/068; H02J 3/322; H02J 9/062; H02J 2300/24; H02J 2300/28; H02J 3/381; H02J 9/061; B60L 53/14; B60L 53/51; B60L 53/52; B60L 55/00; B60L 53/66; Y02T 10/70; H02H 3/38
USPC .......................................................... 307/65
See application file for complete search history.

(56) References Cited

U.S. PATENT DOCUMENTS

| | | | |
|---|---|---|---|
| 11,183,843 B1* | 11/2021 | Cooper ...................... | H02J 1/10 |
| 2018/0037121 A1* | 2/2018 | Narla ....................... | B60L 55/00 |
| 2021/0218248 A1* | 7/2021 | Bozchalui ................. | H02J 3/32 |

FOREIGN PATENT DOCUMENTS

| | | |
|---|---|---|
| CN | 108407625 A | 8/2018 |
| CN | 108899881 A | 11/2018 |
| CN | 111509834 A | 8/2020 |

\* cited by examiner

*Primary Examiner* — Rexford N Barnie
*Assistant Examiner* — Swarna N Chowdhuri
(74) *Attorney, Agent, or Firm* — CKC & Partners Co., LLC

(57) ABSTRACT

The application discloses an automatic transfer switch and a power supply system. The automatic transfer switch includes: a first switch unit having a first end connected to a first device through a converter port, and a second end electrically connected to a power grid through a power grid port; a second switch unit having a first end connected to a second device through an electric vehicle port and a charging/discharging circuit unit, and a second end electrically connected to the second end of the first switch unit; a third switch unit, having a first end electrically connected to the power grid through the power grid port, and a second end electrically connected to a load through a load port; a sampling unit; and a control unit connected to the sampling unit.

16 Claims, 6 Drawing Sheets

AUTOMATIC TRANSFER SWITCH AND POWER SUPPLY SYSTEM

CROSS-REFERENCE TO RELATED APPLICATIONS

This non-provisional application claims priority under 35 U.S.C. § 119(a) on Patent Application No. 202210043011.2 filed in P.R. China on Jan. 14, 2022, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

BACKGROUND

1. Field

The application relates to the field of power electronics, and particularly to an automatic transfer switch and a power supply system.

2. Related Art

With emerging of new energy sources (or referred to as renewable energy sources), in order to overcome deficiencies of instability and unreliability of the renewable energy sources, an indoor energy storage system (ESS) is indispensable for a power supply system of a building. In the fields of new energy source and ESS, users have to switch the power source quickly when the power grid is powered off or powered on suddenly, thereby creating the Automatic Transfer Switch (ATS) component. Accordingly, the ATS is a key component of ESS and the new energy power supply system. And the ATS will automatically switch between the power grid and the standby energy source to ensure providing power supply for the users.

Popularization of electric vehicles has become an open policy of the countries, and popularization of the electric vehicles depends on the popularization of charging piles. As can be seen from the market, lack of the charging piles is the current main obstacle of popularization of the electric vehicles, and thus the market has a huge demand for the charging piles.

When facing the current situation, suppliers of the energy storage system and the new energy power supply system all attempt to add function of the charging piles into the whole system to enhance product competitiveness. Meanwhile, combination of the energy storage system and the new energy power supply system with the charging piles is also a predictable technology development trend. Currently, the market has worked out charging piles solution including new energy inverters, and in such solutions, although the charging piles are provided with function of the new energy inverters, the switch function of power input in home buildings or industrial buildings is not involved.

On one hand, although the market has various solutions of the ATS, they are all devoted to optimizing performance of the ATS and improving reliability of the ATS.

On the other hand, although the concept of ATS is introduced inside a part of the charging piles, generally, still only function of the charging piles is achieved. For example, some solutions achieve allocation of energy inside the charging piles using the ATS, and some other solutions achieve switching between charging and discharging functions using the ATS.

SUMMARY

An object of the application is to provide an automatic transfer switch and a power supply system, and the automatic transfer switch and power supply system can solve one or more deficiencies in the prior art.

In order to achieve the above object, according to one embodiment of the invention, the application provides an automatic transfer switch, including: a first switch unit having a first end connected to a first device through a converter port, and a second end electrically connected to a power grid through a power grid port; a second switch unit having a first end connected to a second device through an electric vehicle port and a charging/discharging circuit unit, and a second end electrically connected to the second end of the first switch unit; a third switch unit having a first end electrically connected to the power grid through the power grid port, and a second end electrically connected to a load through a load port; a sampling unit, configured to sample parameters on a connection path between any two of the converter port, the electric vehicle port, the power grid port and the load port; and a control unit connected to the sampling unit, configured to correspondingly control the on/off of the first switch unit, the second switch unit and the third switch unit according to the parameters sampled by the sampling unit, for disconnecting or connecting any two of the first device, the second device, the power grid and the load.

BRIEF DESCRIPTION OF THE DRAWINGS

The exemplary embodiments are described in details with reference to the accompanying drawings, through the accompanying drawings the above and other features and advantages of the application will become more apparent.

DETAILED EMBODIMENTS

Figure 1:
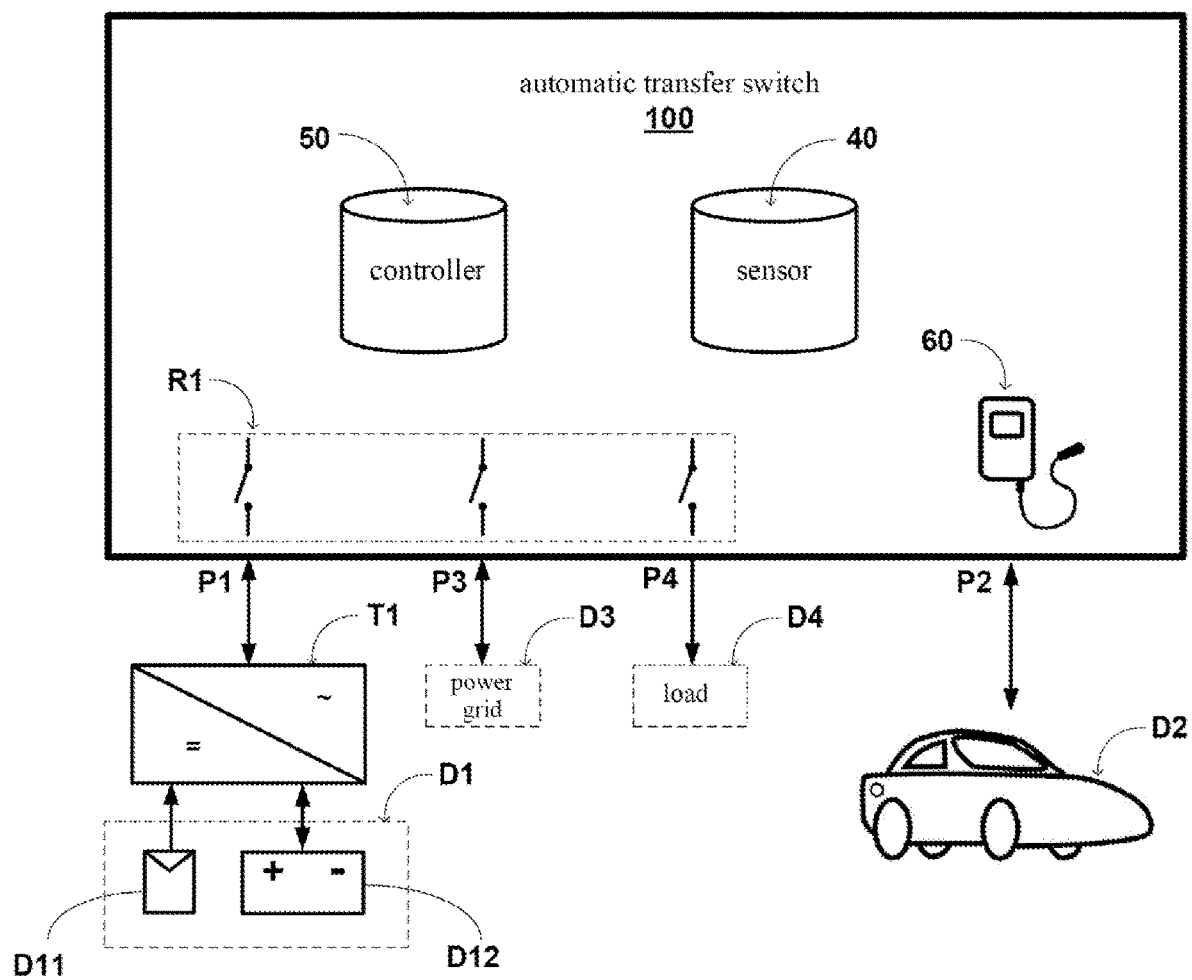
FIG. 1 is a schematic diagram of a power supply system including an automatic transfer switch (ATS) in home buildings or industrial buildings according to one embodiment of the invention, wherein the ATS is integrated with function of a charging pile.

The exemplary embodiments will now be described more fully with reference to the accompanying drawings. However, the exemplary embodiments can be implemented in various forms and shall not be understood as being limited to the embodiments set forth herein; on the contrary, these embodiments are provided so that this application will be thorough and complete, and the conception of exemplary embodiments will be fully conveyed to those skilled in the art. In the drawings, the same reference signs denote the same or similar structure, so their detailed description will be omitted.

When factors/components/the like described and/or illustrated here are introduced, the phrases "one", "a(an)", "the", "said" and "at least one" refer to one or more factors/components/the like. The terms "include", "comprise" and "have" refer to an open and included meaning, and refer to additional factors/components/the like, in addition to the listed factors/components/the like. The embodiments may use relative words, such as, "up" or "down" to describe a relative relation of one component of the sign over another component. It can be understood that if the device of the sign is inverted upside down, the component on an "up" side becomes a component on a "down" side. In addition, the terms "first", "second" and the like in the claims are only used as signs, instead of numeral limitations to objects. Besides, "charging/discharging" as mentioned below represents "charging and/or discharging". And the "switch unit" as mentioned below includes all power switches R1 (e.g., relays) that connect or disconnect a port in single-phase, split-phase or three-phase power supply system.

FIG. 1 is a schematic diagram of a power supply system 200 including an automatic transfer switch (ATS) 100 in home buildings or industrial buildings according to one embodiment of the invention. The power supply system 200 includes an energy conversion device T1 (e.g., a DC-AC inverter). The energy conversion device T1 may be powered by a first device D1. In an embodiment of FIG. 1, the first device D1 includes a first sub device D11 and a second sub device D12, the first sub device D11 and the second sub device D12 may be new energy devices (including but not limited to devices using solar energy or wind energy) and/or energy storage devices (including but not limited to batteries). For example, the first sub device D11 is the new energy device, and the second sub device D12 is the energy storage device. In other words, the energy conversion device T1 may be powered by the solar energy or the wind energy, and also may be powered by the batteries. An output of the energy conversion device T1 is connected to a converter port P1 of the ATS 100, and may provide power supply for a load D4 through a load port P4 of the ATS 100. When applied to home buildings, the load D4 may be a home load, such as, lamp, refrigerator, TV, washing machine, and the like.

In some embodiments, the ATS 100 further includes a charging/discharging circuit unit 60. For example, the charging/discharging circuit unit 60 may be a charging pile or a charging and discharging pile. In such way, function of the charging pile or the charging and discharging pile is integrated in the ATS 100, and the ATS 100 may charge and/or discharge a second device D2 (e.g., including but not limited to an electric vehicle) through the charging/discharging circuit unit 60.

In some embodiments, the power supply system 200 further includes a power grid D3. The power grid D3 is connected to a power grid port P3 of the ATS 100, and may provide power supply for the load D4 through the load port P4 and provide power supply for the second device D2 through the electric vehicle port P2.

In some embodiments, the ATS 100 further includes a plurality of power switches R1, such as, relays. Ports (e.g., including the converter port P1 and the power grid port P3) electrically connected to respective power sources may be connected or disconnected to other ports of the ATS 100 through these power switches R1. Also, ports (e.g., including the load port P4 and the electric vehicle port P2) electrically connected to the respective loads may be connected or disconnected to ports electrically connected to the respective power sources through these power switches R1.

In some embodiments, the ATS 100 further includes a control unit 50 (e.g., a controller) and a sampling unit 40 (e.g., a sensor). The sampling unit 40 may detect state data (including but not limited to parameters of the respective ports) of the respective ports (e.g., the converter port P1, the electric vehicle port P2, the power grid port P3 and the load port P4), and transmit relative state data to the control unit 50. The control unit 50 may control conducting or non-conducting of the respective power switches R1 according to certain arrangements or instructions.

Figure 2:
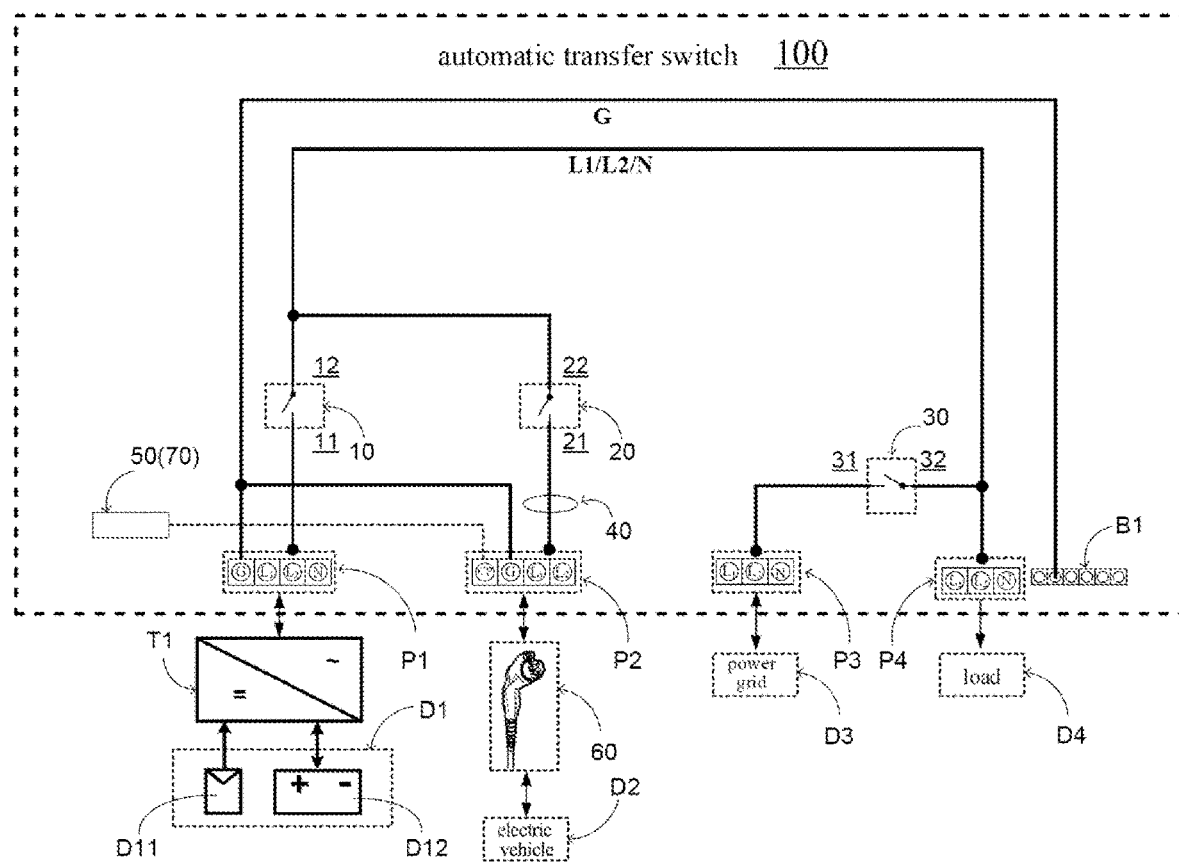
FIG. 2 is a schematic diagram of one embodiment of the ATS according to the invention.

The ATS 100 is a central node of the whole power supply system 200. In one embodiment of the invention, as shown in FIG. 2 with reference to FIG. 1, the ATS 100 may include a first switch unit 10, a second switch unit 20, a third switch unit 30, a sampling unit 40 and a control unit 50.

The first switch unit 10 has a first end 11 and a second end 12. The first end 11 of the first switch unit 10 is electrically connected to the energy conversion device T1 through the converter port P1. The energy conversion device T1 is electrically connected to the first device D1. and the second end 12 of the first switch unit 10 is electrically connected to the power grid D3 through the power grid port P3. In addition, the second end 12 of the first switch unit 10 may be electrically connected to the power grid port P3 through other devices, such as, the third switch unit 30 and/or a manual switch unit 80. For example, the first device D1 may include a first sub device D11 and a second sub device D12. The first sub device D11 and the second sub device D12, for example, may be new energy devices and/or energy storage devices. Illustratively, the new energy devices may include but not limited to photovoltaic power devices or wind energy power devices, and the energy storage devices may include but not limited to energy storage batteries. The first switch unit 10 is electrically connected to the first sub device D11 and the second sub device D12 through the energy conversion device T1. The energy conversion device T1, for example, may include but not limited to an inverter. The first switch unit 10 may be configured to connect or disconnect the first device D1.

The second switch unit 20 has a first end 21 and a second end 22. The first end 21 of the second switch unit 20 is electrically connected to the second device D2 through the electric vehicle port P2 and the charging/discharging circuit unit 60, and a second end 22 of the second switch unit 20 is electrically connected to the second end 12 of the first switch unit 10. The second device D2, for example, may be an electric vehicle, and the charging/discharging circuit unit 60, for example, may be a charging pile having charging function or a charging and discharging pile having charging and discharging function. The second switch unit 20 may be configured to connect or disconnect the second device D2 (e.g., the electric vehicle), thereby achieving function of the relays in the charging pile or the charging and discharging pile.

The third switch unit 30 has a first end 31 and a second end 32. The first end 31 of the third switch unit 30 is electrically connected to the power grid D3 through the power grid port P3, and a second end 32 of the third switch unit 30 is electrically connected to the load D4 through the load port P4. The third switch unit 30 may be configured to connect or disconnect the electrical path between the power grid port P3 and the load port P4.

The sampling unit 40 may be configured to sample parameters on a connection path between any two of the converter port P1, the electric vehicle port P2, the power grid port P3, and the load port P4. FIG. 2 only illustrates the sampling unit 40 on the electric vehicle port P2, but it can be understood that the corresponding sensor may be configured as the sampling unit 40 at positions of other ports or other desired positions of the ATS. The sampling unit 40 may sample working states (including but not limited to parameters of the respective ports, such as, a voltage, a current, and the like) of the respective ports of the ATS 100, and transmit them to the control unit 50.

The control unit 50 is connected to the sampling unit 40, and may be configured to control conducting or non-conducting of the first switch unit 10, the second switch unit 20 and the third switch unit 30 correspondingly so as to disconnect or connect any one or two of the converter port P1, the electric vehicle port P2, the power grid port P3 and the load port P4 according to the parameters sampled by the sampling unit 40. The control unit 50 may turn on or turn off the relays of the respective switch units according to certain arrangements or instructions to achieve function of the ATS as well as achieve function of the charging pile or the charging and discharging pile.

In some embodiments of the invention, the ATS 100 may further include a communication unit 70 in communication with the second device D2. In an embodiment of FIG. 2, the communication unit 70, for example, may be integrated with the control unit 50 together, i.e., into one component. However, in other embodiments, the communication unit 70 also may be an individual component separated from the control unit 50. Moreover, the communication unit 70 also may be configured to communicate with one or more other devices, such as, the charging/discharging circuit unit 60 or the second device D2.

In the embodiment of FIG. 2, the first device D1 includes the first sub device D11 and the second sub device D12. The first sub device D11 and the second sub device D12, for example, may be new energy devices and/or energy storage devices, and the new energy devices may be photovoltaic power devices or wind energy power devices, and the energy storage devices may be energy storage batteries. The first switch unit 10 is electrically connected to the first sub device D11 and the second sub device D12 through the energy conversion device T1. The energy conversion device T1, for example, may be the inverter.

In the embodiment of FIG. 2, each of the first switch unit 10, the second switch unit 20 and the third switch unit 30 may include one or more relays, and these relays are connected to a corresponding first phase line L1, second line L2 and neutral line N, respectively. In addition, respective neutral ends of the converter port P1, the electric vehicle port P2, the power grid port P3 and the load port P4 may be connected to the neutral line N. The respective ground ends of the converter port P1 and the electric vehicle port P2 may be connected to a ground line G, and the ground line G may be further connected to a ground-bar B1 of the ATS 100 to be grounded.

In some embodiments of the invention, the ATS 100 may further provides a signal to the energy conversion device T1 (e.g., the inverter), and the way of providing the signal includes the communication way.

In some embodiments of the invention, the energy conversion device T1 itself also may have function of adjusting a neutral voltage.

Figure 3:
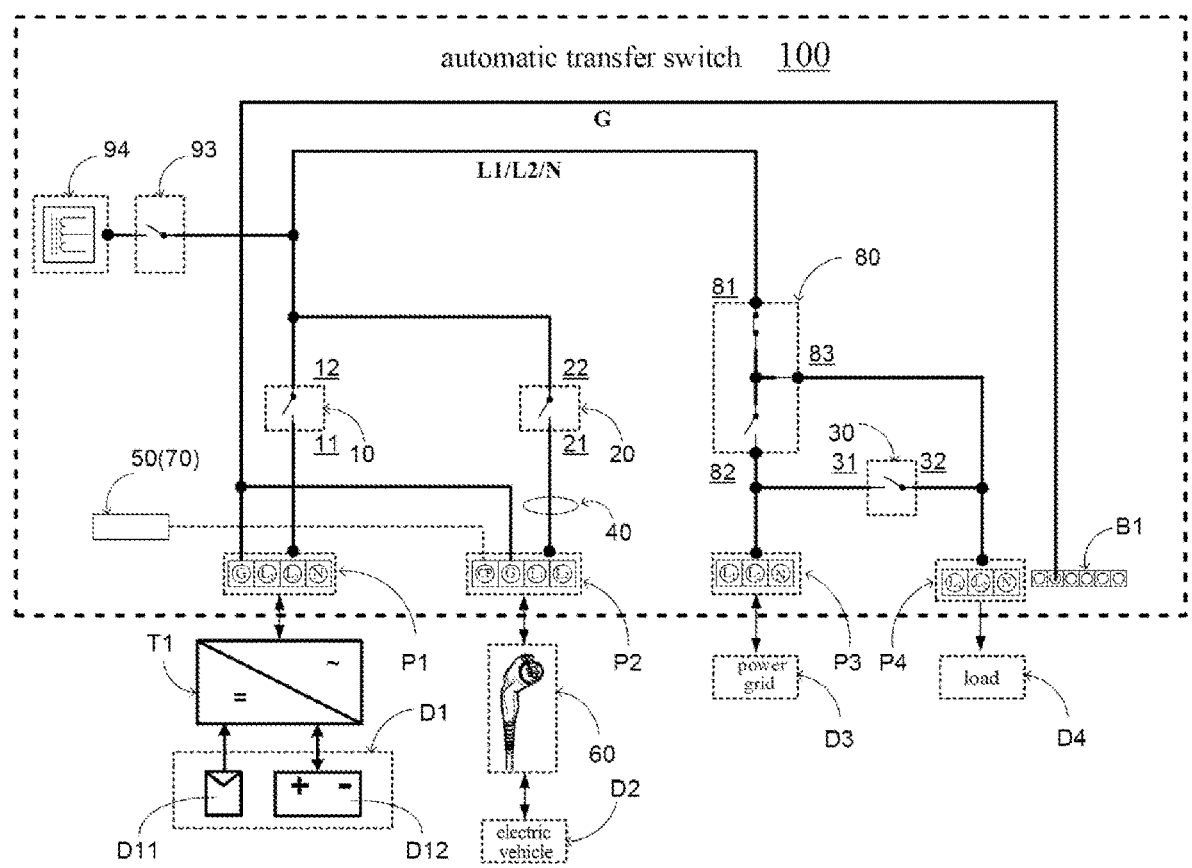
FIG. 3 is a schematic diagram of another embodiment of the ATS according to the invention.
Figure 4:
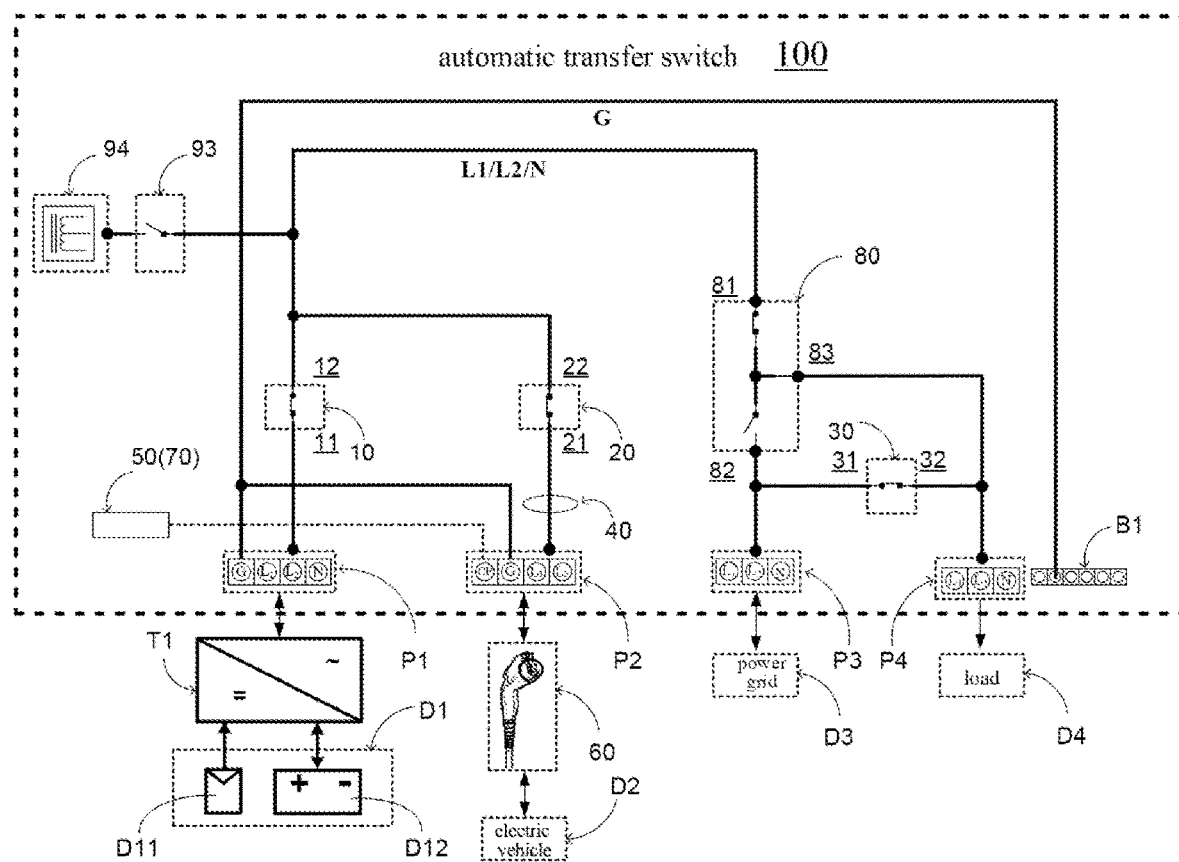
FIG. 4 illustrates a state of the ATS in an on-grid mode.
Figure 5:
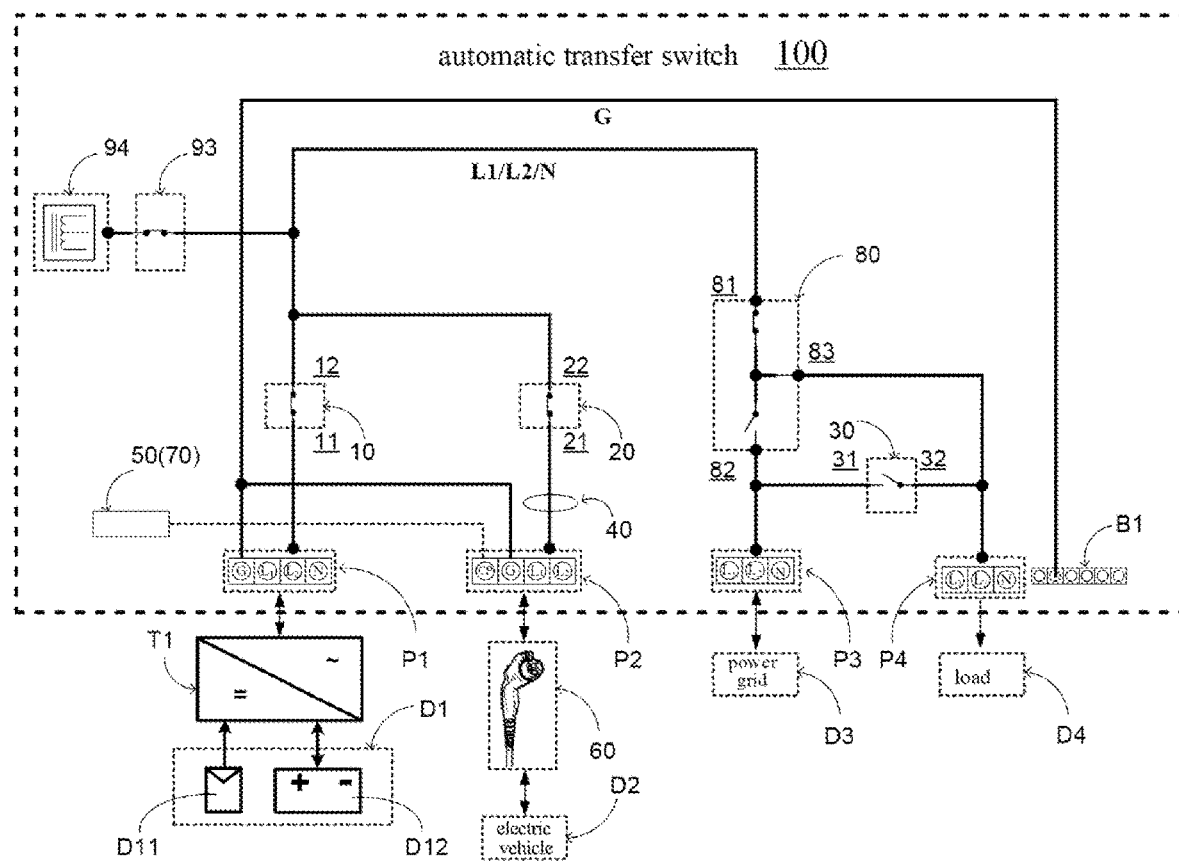
FIG. 5 illustrates a state of the ATS in an off-grid mode.
Figure 6:
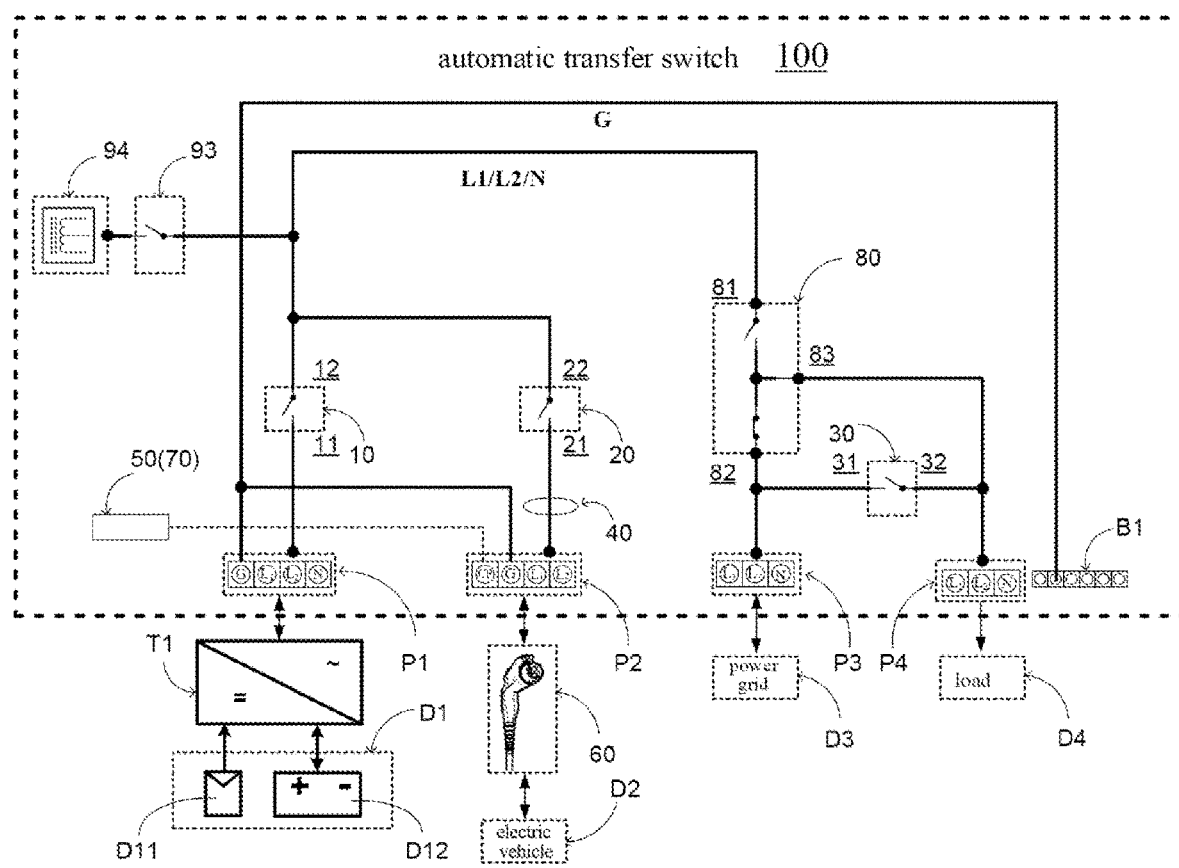
FIG. 6 illustrates a state of the ATS in a maintenance mode.

As shown in FIG. 3, in some embodiments of the invention, the ATS 100 may further include a manual switch unit 80. The manual switch unit 80 has a first end 81, a second end 82 and a third end 83. The first end 81 is electrically connected to the second end 12 of the first switch unit 10 and the second end 22 of the second switch unit 20. The second end 82 is electrically connected to the power grid port P3 and the first end 31 of the third switching unit 30. The third end 83 is electrically connected to the load port P4 and the second end 32 of the third switch unit 30. Moreover, the manual switch unit 80 can be switchable between a first state and a second state. In the first state, the manual switch unit 80 may be configured to connect the load D4 and/or the power grid D3 to the first device D1 and/or the second device D2, as shown in FIGS. 4 and 5. In the second state, the manual switch unit 80 may be configured to directly connect the load to the power grid in a maintenance mode, as shown in FIG. 6.

As shown in FIG. 3, in some embodiments of the invention, the ATS 100 may further include a transformer switch unit 93. The transformer switch unit 93 is connected between an autotransformer 94 and the second end 12 of the first switch unit 10, and the transformer switch unit 93 is used to connect or disconnect the autotransformer 94.

As shown in FIG. 4, it illustrates a state where the ATS 100 is in an on-grid mode. In the on-grid mode, the first switch unit 10, the second switch unit 20 and the third switch unit 30 are in a conducting state. The transformer switch unit 93 is in a non-conducting state, and may balance voltages of different phase lines via the power grid D3. The manual switch unit 80 is in the first state. In the on-grid mode, the first device D1 and/or the power grid D3 may provide power supply for the second device D2 and/or the load D4. In some embodiments, the first device D1 also may transmit excess electric energy to the power grid D3. In some other embodiments, the first device D1 and/or the second device D2 (e.g., the electric vehicle) also may provide power supply for the power grid D3 and/or the load D4.

As shown in FIG. 5, it illustrates a state where the ATS 100 is in an off-grid mode. In the off-grid mode, the first switch unit 10 and the second switch unit 20 are in the conducting state, and the third switch unit 30 is in a non-conducting state. The transformer switch unit 93 is in a conducting state, and may balance voltages of different phase lines to the neutral line via the autotransformer 94. The manual switch unit 80 is in the first state. In the off-grid mode, the power grid D3 is powered off, and may provide power supply for the second device D2 and/or the load D4 through the first device D1. In some embodiments, the second device D2 also may provide power supply for the load D4.

As shown in FIG. 6, it illustrates a state where the ATS 100 is in a maintenance mode. In the maintenance mode, the first switch unit 10, the second switch unit 20 and the third switch unit 30 are in the non-conducting state, and the transformer switch unit 93 is in the non-conducting state. The manual switch unit 80 is in the second state. In the maintenance mode, the power grid D3 may be forcibly connected to the load D4, while the first device D1 and the second device D2 are forcibly disconnected. At this time, turning on or turning off the respective relays controlled by the control unit 50 may be irrelative to the working states of the ATS. Here maintenance and repair work can be performed in the maintenance mode.

FIGS. 4 to 6 explain states where the ATS 100 are in different modes such as the on-grid mode, the off-grid mode and the maintenance mode taking the embodiment of FIG. 3 as example. It can be understood that as for the embodiment without the manual switch unit 80 and the autotransformer 94 shown in FIG. 2, the first switch unit 10, the second switch unit 20 and the third switch unit 30 also can be in the state shown in FIG. 4 or FIG. 5 through control of the controller 50, such that the ATS 100 may be in the on-grid mode or the off-grid mode.

It shall be pointed out that all drawings of the application show plans of single-phase powering, but they can be analogized to plans of three-phase powering.

Hereinafter specific working process of function of the charging pile in the ATS is described.

When a charging gun of the ATS is inserted into the corresponding port of the electric vehicle (i.e., the second device D2), the control unit 50 inside the ATS may begin to establish communication with the electric vehicle through the communication unit 70 and detect whether safety performances are normal.

After the safety performances are confirmed to be normal, and communication is completed, the ATS turns on the second switch unit 20 to start charging operation. Then, the ATS still always monitor whether the safety performances are abnormal, and the current state is still exchanged between the ATS and the electric vehicle periodically.

After the electric vehicle has been charged completely, or the user unlocks the charging gun, the ATS turns off the second switch unit 20 to stop the charging operation of the charging pile. When the safety performances are abnormal, the ATS timely turns off the second switch unit 20 to achieve protection function.

From the above, no matter whether the power supply is provided by the power grid D3 or the first device D1, the charging pile may work in normal operation and the operation of the second switch unit 20 will not be affected. However, it can be understood that designer of the ATS also can set the charging pile (i.e., the charging/discharging circuit unit 60) to have different power levels or other functions under different powering. Moreover, when the charging pile in the ATS is replaced with the charging and discharging pile having discharging function, the electric vehicle also may become an energy storage component in the energy storage system, and the electric vehicle port P2 also can provide power supply for the load port P4.

The application has at least one of the following advantages:

(1) After integration, the ATS and the charging pile (or the charging and discharging pile) share components such as relays, sensors, control units and communication units, and thereby the structure of the system may be simplified, and cost may be reduced.

(2) As for the users, the integrated product may reduce cable connection and save the occupied space, and reduce installation difficulty and complexity of maintenance, and simplify the use and operation of the whole system.

On the basis of the application, more concepts also can be expanded to integrate multiple systems such as the new energy system, the energy storage system and the electric vehicle energy system into a whole through the ATS, which shows new industry prospect.

Exemplary embodiments of the invention are illustrated and described in details. It shall be understood that the application is not limited to the disclosed embodiments, and in contrast, the application aims to cover various modifications and equivalent arrangements included in spirit and scope of the appended claims.

What is claimed is:

1. An automatic transfer switch, comprising:
a first switch unit having a first end connected to a first device through a converter port, and a second end electrically connected to a power grid through a power grid port;
a second switch unit having a first end connected to a second device through an electric vehicle port and a charging/discharging circuit unit, and a second end electrically connected to the second end of the first switch unit;
a third switch unit having a first end electrically connected to the power grid through the power grid port, and a second end electrically connected to a load through a load port and connected to the second end of the first switch unit and the second end of the second switch unit;
a sampling unit, configured to sample parameters on a connection path between any two of the converter port, the power grid port, the electric vehicle port and the load port; and
a control unit connected to the sampling unit, configured to correspondingly control the on/off of the first switch unit, the second switch unit and the third switch unit according to the parameters sampled by the sampling unit, for disconnecting or connecting any two of the first device, the second device, the power grid and the load, wherein
in an off-grid mode, the first switch unit and the second switch unit are in a conducting state, the third switch unit is in a non-conducting state, so as to disconnect the power grid from any one of the first device, the second device, and the load, and supply power to the second device and the load through the first device.

2. The automatic transfer switch according to claim 1, further comprising:
a communication unit in communication connection with the second device.

3. The automatic transfer switch according to claim 1, wherein the second device is an electric vehicle; the charging/discharging circuit unit is a charging pile or a charging and discharging pile.

4. The automatic transfer switch according to claim 1, wherein the first device comprises a first sub device and a second sub device, wherein the first switch unit is electrically connected to the first sub device and the second sub device through an energy conversion device.

5. The automatic transfer switch according to claim 4, wherein the first sub device and the second sub device are new energy devices or energy storage devices.

6. The automatic transfer switch according to claim 5, wherein the new energy devices comprise photovoltaic power devices or wind energy power devices, the energy storage devices comprise energy storage batteries, and the energy conversion device comprises an inverter.

7. The automatic transfer switch according to claim 1, further comprising a manual switch unit having a first end electrically connected to the second end of the second switch unit, a second end electrically connected to the power grid port, and a third end electrically connected to the load port.

8. The automatic transfer switch according to claim 7, wherein the manual switch unit is switchable between a first state and a second state, when the manual switch unit is in the first state, at least one of the load or the power grid is electrically connected with at least one of the first device or the second device; and when the manual switch unit is in the second state, the load is directly connected to the power grid under a maintenance mode.

9. The automatic transfer switch according to claim 1, wherein each of the first switch unit, the second switch unit and the third switch unit comprises:
a first relay connected to a first phase line; and
a second relay connected to a second phase line.

10. The automatic transfer switch according to claim 1, wherein,
  respective neutral ends of the converter port, the electric vehicle port, the power grid port and the load port are connected to a neutral line.

11. The automatic transfer switch according to claim 9, further comprising:
  a transformer switch unit connected between an autotransformer and the second end of the first switch unit, wherein the transformer switch unit is used to connect or disconnect the autotransformer.

12. The automatic transfer switch according to claim 11, wherein in an off-grid mode, the transformer switch unit is in a conducting state, and in an on-grid mode and a maintenance mode, the transformer switch unit is in a non-conducting state.

13. The automatic transfer switch according to claim 1, wherein,
  in an on-grid mode, the first switch unit, the second switch unit and the third switch unit are in a conducting state.

14. The automatic transfer switch according to claim 1, wherein,
  in an off-grid mode, the first switch unit and the second switch unit are in a conducting state, and the third switch unit is in a non-conducting state.

15. The automatic transfer switch according to claim 8, wherein in the maintenance mode, the first switch unit, the second switch unit and the third switch unit are in a non-conducting state.

16. A power supply system, comprising:
  the automatic transfer switch according to claim 1.

* * * * *